United States Patent
Lin et al.

(10) Patent No.: US 10,665,905 B2
(45) Date of Patent: May 26, 2020

(54) METAL-ION BATTERY

(71) Applicant: Industrial Technology Research Institute, Hsinchu (TW)

(72) Inventors: Chun-Kai Lin, Toucheng Township (TW); Chien-Chih Chiang, New Taipei (TW); Chun-Hsing Wu, Taipei (TW); Kuang-Yao Chen, Ji'an Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 245 days.

(21) Appl. No.: 15/597,426

(22) Filed: May 17, 2017

(65) Prior Publication Data

US 2017/0338524 A1    Nov. 23, 2017

Related U.S. Application Data

(60) Provisional application No. 62/337,629, filed on May 17, 2016.

(30) Foreign Application Priority Data

Dec. 16, 2016 (TW) .............................. 105141735 A

(51) Int. Cl.
*H01M 10/054* (2010.01)
*H01M 4/38* (2006.01)
(Continued)

(52) U.S. Cl.
CPC ......... *H01M 10/44* (2013.01); *H01M 2/1673* (2013.01); *H01M 4/38* (2013.01);
(Continued)

(58) Field of Classification Search
CPC .. H01M 10/44; H01M 2/1673; H01M 10/056; H01M 10/48; H01M 10/054;
(Continued)

(56) References Cited

U.S. PATENT DOCUMENTS 6,485,628 B1    11/2002    Brown et al.
6,558,525 B1     5/2003    Bradford et al.
(Continued)

FOREIGN PATENT DOCUMENTS

CN    105308786 A    2/2016
CN    105529491 A    4/2016
(Continued)

OTHER PUBLICATIONS

Japanese Office Action for Application No. 2017-097885, dated Jun. 5, 2018.
(Continued)

*Primary Examiner* — Muhammad S Siddiquee
(74) *Attorney, Agent, or Firm* — Birch, Stewart, Kolasch & Birch, LLP

(57) ABSTRACT

A metal-ion battery is provided. The metal-ion secondary battery includes a positive electrode, a first negative electrode, a first separator, a second negative electrode, a second separator, and a control element, wherein the first separator is disposed between the positive electrode and the first negative electrode, and the second separator is disposed between the first negative electrode and the second negative electrode. Furthermore, the control element is coupled to the first negative electrode and the second negative electrode, wherein the control element determines whether to electrically connect the first negative electrode to the second negative electrode.

20 Claims, 10 Drawing Sheets

(51) Int. Cl.
*H01M 10/44* (2006.01)
*H01M 2/16* (2006.01)
*H01M 10/42* (2006.01)
*H01M 10/48* (2006.01)
*H01M 4/587* (2010.01)
*H01M 4/66* (2006.01)
*H01M 10/056* (2010.01)
*H01M 10/0525* (2010.01)

(52) U.S. Cl.
CPC ........... *H01M 4/587* (2013.01); *H01M 4/663* (2013.01); *H01M 10/054* (2013.01); *H01M 10/056* (2013.01); *H01M 10/4235* (2013.01); *H01M 10/48* (2013.01); *H01M 10/0525* (2013.01); *H01M 2300/0045* (2013.01)

(58) Field of Classification Search
CPC .... H01M 4/663; H01M 4/38; H01M 10/4235; H01M 4/587; H01M 2300/0045; H01M 10/0525; G01R 31/00
See application file for complete search history.

(56) References Cited

U.S. PATENT DOCUMENTS

| | | |
|---|---|---|
| 7,077,945 B2 | 7/2006 | Bergsma et al. |
| 8,163,418 B1 | 4/2012 | Cardenas-Valencia et al. |
| 2002/0061445 A1 | 5/2002 | Kitagawa et al. |
| 2003/0209426 A1 | 11/2003 | Slaugenhaupt et al. |
| 2012/0104990 A1 | 5/2012 | Boysen et al. |
| 2013/0271085 A1* | 10/2013 | Chen .................. H01M 4/0445 320/132 |
| 2015/0249261 A1 | 9/2015 | Dai et al. |
| 2016/0006081 A1* | 1/2016 | Eaglesham ............ H01M 4/58 429/50 |
| 2016/0013463 A1* | 1/2016 | Roumi ................ H01M 2/1673 429/145 |
| 2016/0111755 A1* | 4/2016 | Liu ...................... H01M 4/667 429/152 |
| 2016/0294207 A1* | 10/2016 | Lau .................. H01M 10/0525 |
| 2019/0006701 A1* | 1/2019 | Dai ........................ H01M 4/38 |

FOREIGN PATENT DOCUMENTS

| | | |
|---|---|---|
| JP | 2001-52744 A | 2/2001 |
| JP | 2014-120255 A | 6/2014 |
| JP | 2015-154003 A | 8/2015 |
| WO | WO 2015/074065 A1 | 5/2015 |
| WO | WO 2017/102577 A1 | 6/2017 |

OTHER PUBLICATIONS

Taiwanese Office Action and Search Report for Taiwanese Application No. 105141735, dated Jun. 20, 2017.
Extended European Search Report, dated Sep. 14, 2017, for European Application No. 17171510.5.

* cited by examiner

METAL-ION BATTERY

CROSS REFERENCE TO RELATED APPLICATIONS

The application is based on, and claims priority from, Taiwan Application Serial Number 105141735, filed on Dec. 16, 2016, the disclosure of which is hereby incorporated by reference herein in its entirety.

TECHNICAL FIELD

The technical field relates to a metal-ion battery.

BACKGROUND

Aluminum is the most abundant metal on earth, and electronic devices made of aluminum have the advantage of costing little. An aluminum-based redox couple, which involves three electron transfers during the electrochemical charge/discharge reactions, provides storage capacity that is competitive with that of a single-electron lithium-ion battery. Additionally, because of its lower reactivity and flammability, such an aluminum-ion battery might offer significant safety improvements.

In a conventional metal-ion battery with an aluminum electrode, the aluminum of the aluminum electrode and the aluminum deposited on the negative electrode are ionized during discharge. However, the aluminum cannot be recovered back to its original position on the aluminum electrode. As a result, after numerous charge and discharge cycles, the aluminum electrode can break, resulting in a reduction of the capacity and lifetime of the metal-ion battery.

Therefore, there is a need to develop a novel battery, which prevents the negative from being damaged while in operation, exhibiting a high capacity and long lifetime.

SUMMARY

According to embodiments of the disclosure, the disclosure provides a storage device, such as metal-ion battery. The metal-ion battery includes a positive electrode, a first negative electrode, a first separator, a second negative electrode, a second separator, and a control element, wherein the first separator is disposed between the positive electrode and the first negative electrode, and the second separator is disposed between the first negative electrode and the second negative electrode. In addition, the control element is coupled to the first negative electrode and the second negative electrode, wherein the control element determines whether to electrically connect the first negative electrode to the second negative electrode.

A detailed description is given in the following embodiments with reference to the accompanying drawings.

DETAILED DESCRIPTION

Figure 1:
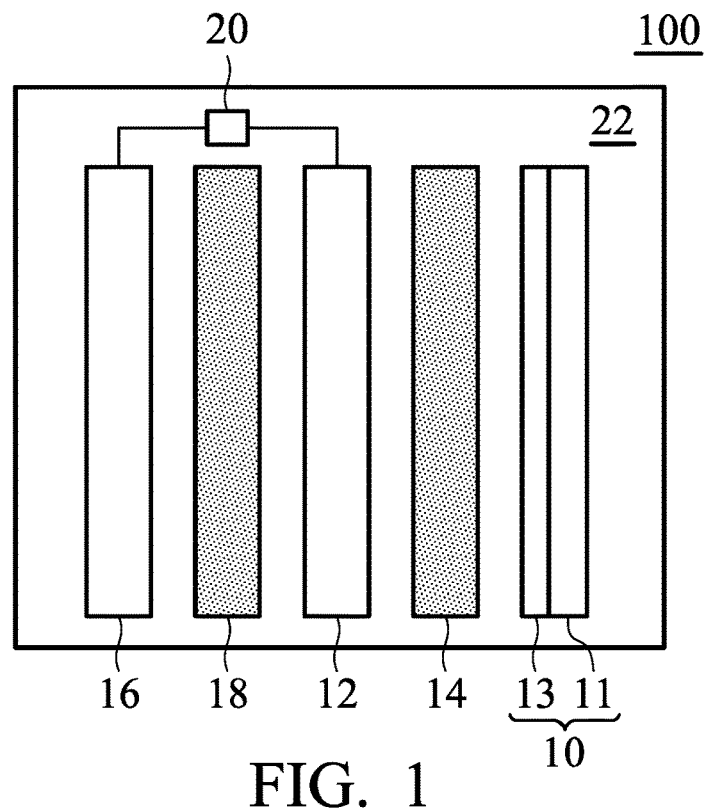
FIG. 1 is a schematic view of the metal-ion battery according to embodiments of the disclosure.

In the following detailed description, for the purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

The disclosure provides a metal-ion battery. According to embodiments of the disclosure, since the negative electrode of the metal-ion battery of the disclosure includes a first negative electrode, a second negative electrode serving as a source for providing metal-ions, and a control element which determines whether to electrically connect the first negative electrode to the second negative electrode, the electric current of the first negative electrode is introduced to the second negative electrode by the control element in order to increase the amount of halometallate when the amount of the halometallate in the metal-ion battery is not sufficient.

FIG. 1 is a schematic view of the metal-ion battery 100 according to an embodiment of the disclosure. As shown in FIG. 1, the metal-ion battery 100 can include a positive electrode 10, a first negative electrode 12, a first separator 14 disposed between the positive electrode 10 and the first negative electrode 12, a second negative electrode 16, and a second separator 18 disposed between the first negative electrode and the second negative electrode. The first separator 14 can mitigate against electrical shorting of the positive electrode 10 and the first negative electrode 12, and the second separator 18 can mitigate against electrical shorting of the first negative electrode 12 and the second negative electrode 16. In addition, a control element 20 is coupled to the first negative electrode 12 and the second negative electrode 16, wherein the control element 20 determines whether to electrically connect the first negative electrode 12 to the second negative electrode 16. As shown in FIG. 1, the first negative electrode 12 can be disposed between the first separator 14 and the second separator 18. The metal-ion battery 100 further includes an electrolyte 22 disposed within the metal-ion battery 100 and contacting the positive electrode 10, the first separator 14, the first negative electrode 12, the second separator 18, and the second negative electrode 16. The metal-ion battery 100 can be a rechargeable secondary battery, although primary batteries also are encompassed by the disclosure.

According to embodiments of the disclosure, the positive electrode 10 can include a current-collecting layer 11 and an active material 13 disposed on the current-collecting layer 11. According to embodiments of the disclosure, the positive electrode 10 can consist of the current-collecting layer 11 and the active material 13. According to embodiments of the disclosure, the current-collecting layer 11 can be a conductive carbon substrate, such as carbon cloth, carbon felt, or carbon paper. For example, the conductive carbon substrate can have a can have a sheet resistance from about 1 mΩ·cm² to 6 mΩ·cm² and a carbon content of greater than 65 wt %. The active material 13 can include a layered active layer or an agglomeration of the layered active layer. According to embodiments of the disclosure, the active material 13 can be an intercalated carbon material, such as graphite (including natural graphite, artificial graphite, mesophase carbon microbeads, pyrolytic graphite, foaming graphite, flake graphite, or expanded graphite), graphene, carbon nanotube or a combination thereof. According to embodiments of the disclosure, the active material 13 can be layered double hydroxide, layered oxide, layered chalcogenide or a combination thereof. The active layer 13 can have a porosity between about 0.05 and 0.95, such as between about 0.3 and 0.9. The active material 13 can grow directly on the current-collecting layer 11 (i.e. there is no other layer between the active layer and the current-collecting layer). Furthermore, the active material 13 can be affixed to the current-collecting layer 11 via an adhesive.

Figure 2:
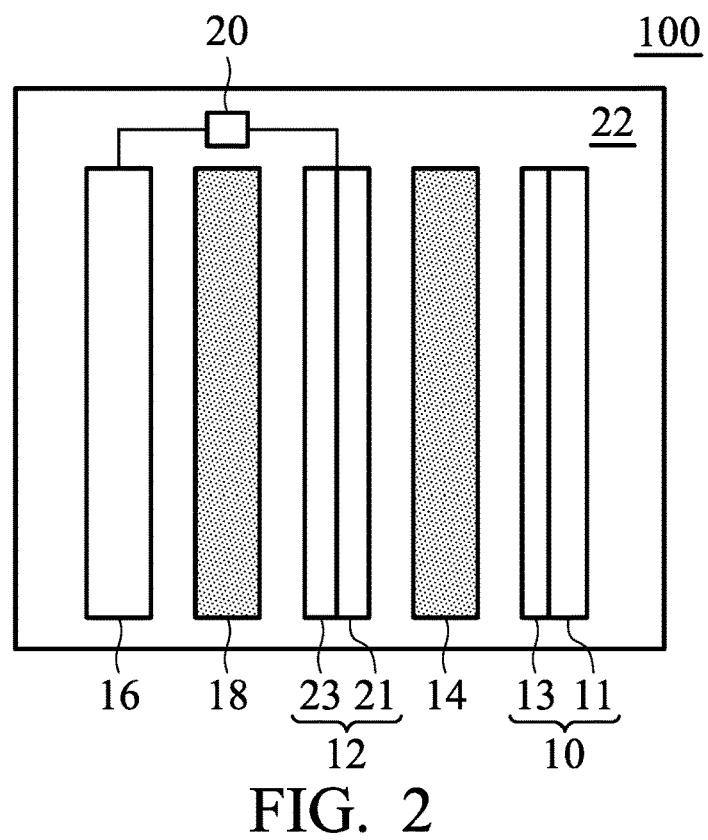
FIGS. 2 and 3 are schematic views of the metal-ion battery according to other embodiments of the disclosure.
Figure 3:
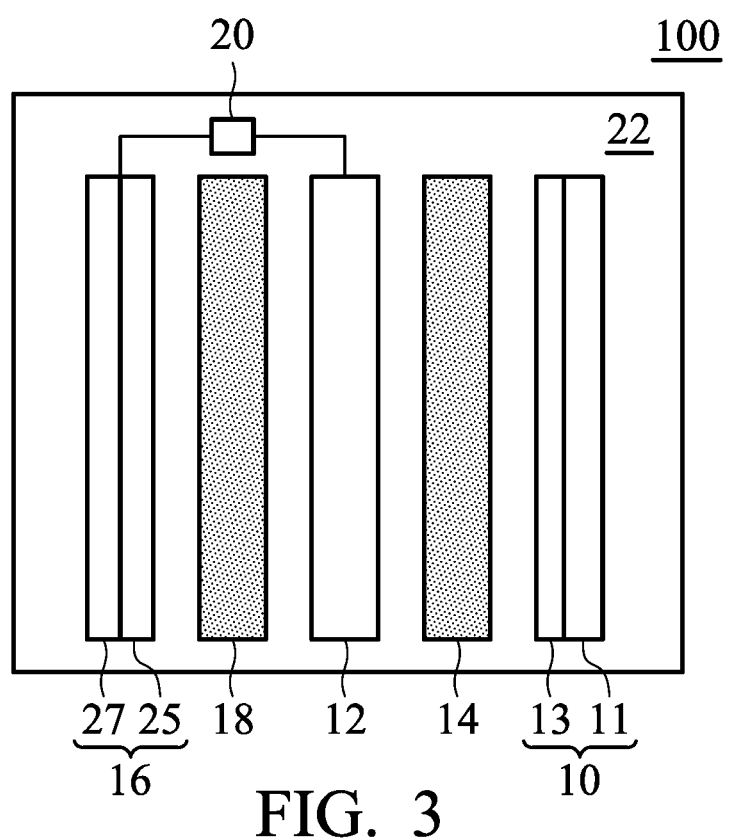

According to embodiments of the disclosure, the first negative electrode 12 can include a first metal or an alloy thereof, a current-collecting layer, or a combination thereof. For example, the first negative electrode 12 can consist of the first metal or an alloy thereof. In addition, the first negative electrode 12 can also be a current-collecting layer. Moreover, as shown in FIG. 2, the first negative electrode 12 can consist of a current-collecting layer 21 and a first metal or an alloy thereof 23 (disposed on the current-collecting layer 21). According to embodiments of the disclosure, the second negative electrode 16 can include a second metal or an alloy thereof, a current-collecting layer, or a combination thereof. For example, the second negative electrode 16 can consist of the second metal or an alloy thereof. In addition, the second negative electrode 16 can also be a current-collecting layer. Moreover, as shown in FIG. 3, the second negative electrode 16 can also consist of a current-collecting layer 25 and a second metal or an alloy thereof 27 (disposed on the current-collecting layer 23). In particular, the current-collecting layer 21 and 25 can be a conductive carbon substrate, such as a carbon cloth, carbon felt, or carbon paper. For example, the conductive carbon substrate can have a sheet resistance from about 1 mΩ·cm² to 6 mΩ·cm², and a carbon content of greater than 65 wt %. It should be noted that the first negative electrode 12 and the second negative electrode cannot both be current-collecting layers.

According to embodiments of the disclosure, the first metal can be an inactive metal (such as nickel, tungsten, tantalum, molybdenum, gold, lead, platinum, or silver), and the second metal can be a metal which has a smaller reduction potential than the first metal (such as aluminum, copper, zinc, tin, or iron). According to some embodiments of the disclosure, the second metal can be an inactive metal (such as nickel, tungsten, tantalum, molybdenum, gold, lead, platinum, or silver), and the first metal can be a metal which has a smaller reduction potential than the second metal (such as aluminum, copper, zinc, tin, or iron). It should be noted that the first metal and the second metal cannot both be inactive metal (such as nickel, tungsten, tantalum, molybdenum, gold, lead, platinum, or silver).

For example, in an embodiment of the disclosure, the first negative electrode 12 can consist of a current-collecting layer and a first metal or an alloy thereof, and the second negative electrode 16 can consist of a second metal or an alloy thereof. In particular, the first metal can be an inactive metal (such as nickel, tungsten, tantalum, molybdenum, gold, lead, platinum, or silver), and the second metal can be a metal (such as aluminum, copper, zinc, tin, or iron) which has a smaller reduction potential than the first metal. In addition, the second metal can also be inactive metal (such as nickel, tungsten, tantalum, molybdenum, gold, lead, platinum, or silver), and the first metal can be a metal (such as aluminum, copper, zinc, tin, or iron) which has a smaller reduction potential than the second metal. It should be noted that the first metal and the second metal cannot both be inactive metal.

In another embodiment of the disclosure, the first negative electrode 12 can be a current-collecting layer, and the second negative electrode 16 can consist of the second metal or an alloy thereof. In particular, the second metal can be aluminum, copper, zinc, tin, or iron. In addition, the first negative electrode 12 can consist of the first metal or an alloy thereof, and the second negative electrode 16 can be a current-collecting layer. In particular, the first metal can be aluminum, copper, zinc, tin, or iron.

In an embodiment of the disclosure, the first negative electrode can consist of the first metal or an alloy thereof, and the second negative electrode can consist of the second metal or an alloy thereof. In particular, the first metal can be an inactive metal (such as nickel, tungsten, tantalum, molybdenum, gold, lead, platinum, or silver), and the reduction potential of the second metal (such as aluminum, copper, zinc, tin, or iron) is smaller than the reduction potential of the first metal. In addition, the second metal can also be an inactive metal (such as nickel, tungsten, tantalum, molybdenum, gold, lead, platinum, or silver), and the reduction potential of the first metal (such as aluminum, copper, zinc, tin, or iron) is smaller than the reduction potential of the second metal.

According to embodiments of the disclosure, the material of the first separator 14 is the same as or different from the material of the second separator 18. The material of the first separator and second separator can be glass fiber, polyethylene (PE), polypropylene (PP), nonwoven fabric, wood fiber, or a combination thereof.

According to embodiments of the disclosure, the electrolyte 22 can include ionic liquid, and/or a metal halide. The ionic liquid can be an ionic liquid which is suitable for use in a metal-ion battery. The ionic liquid can include urea, N-methylurea, choline chloride, ethylchlorine chloride, alkali halide, dimethyl sulfoxide, methylsulfonylmethane, alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or mixtures thereof. The metal halide can be aluminum chloride, copper chloride, zinc chloride, tin chloride, ferric chloride, or a combination thereof. For example, a molar ratio of the metal halide to the ionic liquid is at least about 1.1 or at least about 1.2, such as between 1.1 and 2.1. According to embodiments of the disclosure, when the metal halide is aluminum chloride ($AlCl_3$), the ionic liquid can be 1-ethyl-3-methylimidazolium chloride, and the molar ratio of the aluminum chloride to 1-ethyl-3-methylimidazolium chloride is at least about 1.2, such as between 1.2 and 1.8. An ionic liquid electrolyte can be doped (or have additives added) to increase electrical conductivity and lower the viscosity, or can be otherwise altered to yield compositions that favor the reversible electrodeposition of metals.

According to embodiments of the disclosure, the control element 20 of the metal-ion battery 100 can determine whether to electrically connect the first negative electrode 12 to the second negative electrode 16. Therefore, when the halometallate concentration of the metal-ion battery 100 is too low, the control element 20 can introduce the electric current of the negative electrode from first negative electrode 12 to the second negative electrode 16 during discharging, in order to increase the halometallate concentration. Therefore, the halometallate concentration of the metal-ion battery 100 can be controlled, resulting in the total capacity of the metal-ion battery maintaining a certain level and the lifetime of the metal-ion battery being increased.

According to embodiments of the disclosure, the control element 20 can be a comparison circuitry for measuring the time period T, during which the metal-ion battery reaches a predetermined charging voltage during charging, and for comparing the time period T with a predetermined time period T0. When the time period T is shorter than the predetermined time period T0, the comparison circuitry can be configured to electrically connect the first negative electrode to the second negative electrode during discharging of the metal-ion battery, and thus the electric current of the negative electrode is introduced from the first negative electrode to the second negative electrode. As a result, the halometallate concentration of the electrolyte can be increased by subjecting the second negative electrode to an electrochemical reaction. The predetermined time period T0 is the time period required to charge the metal-ion battery to a predetermined specific capacity. In particular, the predetermined specific capacity can optionally be adjusted and can be from about 60 mAh/g to 90 mAh/g.

Figure 4:
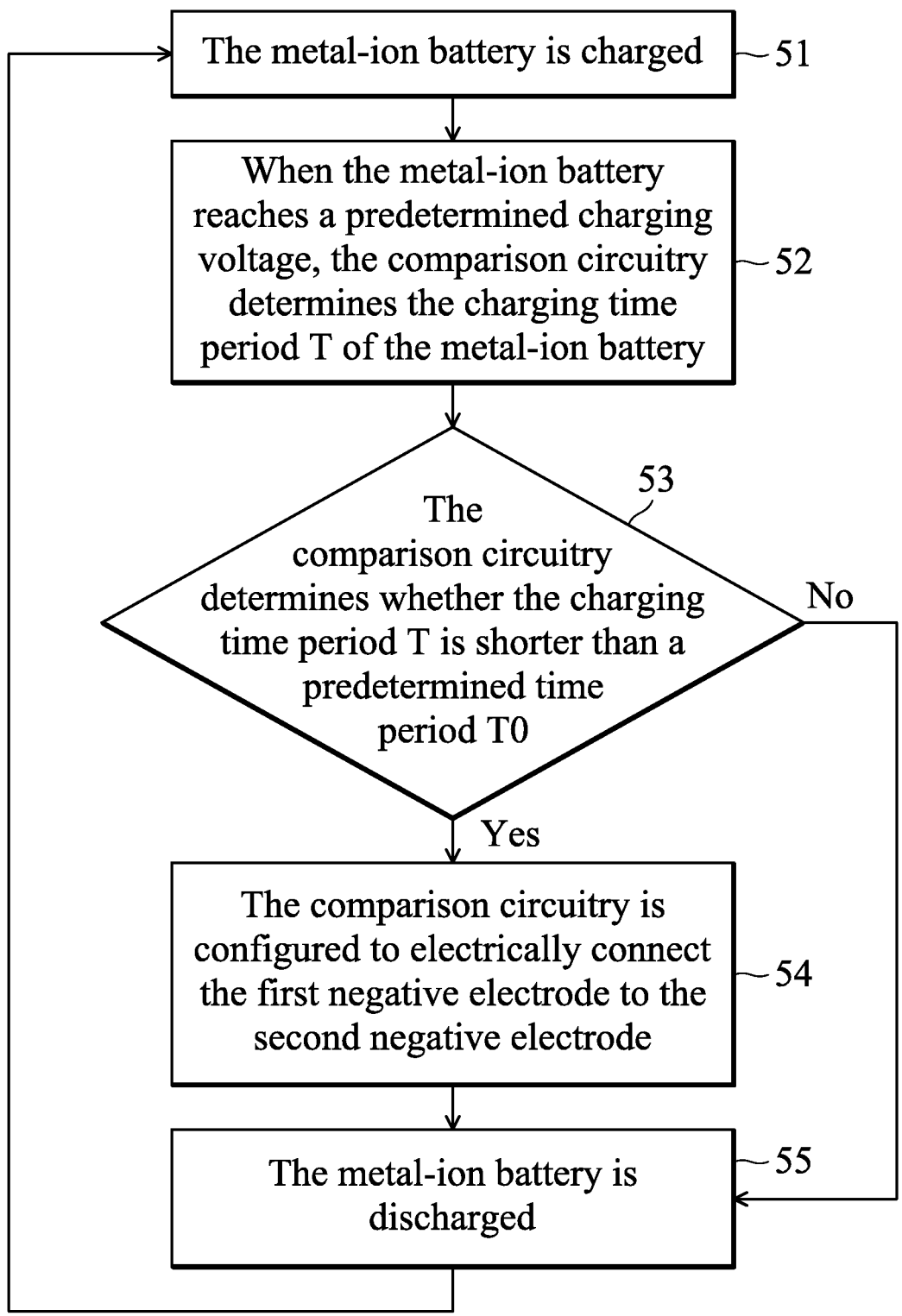
FIG. 4 is a flow chart illustrating the steps of the metal-ion battery according to an embodiment of the disclosure during charging and discharging.

FIG. 4 is a flow chart illustrating the steps of the metal-ion battery according to an embodiment of the disclosure during charging and discharging. The metal-ion battery includes a comparison circuitry serving as a control element. First, the metal-ion battery is charged (step 51), and the comparison circuitry begins timing. Next, when the metal-ion battery reaches a predetermined charging voltage, the comparison circuitry determines the charging time period T of the metal-ion battery (step 52). Next, the comparison circuitry determines whether the charging time period T is shorter than a predetermined time period T0 (step 53). If the charging time period T is longer than the predetermined time period T0, the metal-ion battery is ready to be discharged (step 54). If the charging time period T is shorter than the predetermined time period T0, the comparison circuitry is configured to electrically connect the first negative electrode to the second negative electrode during discharging of the metal-ion battery, and thus the electric current of the negative electrode is introduced from the first negative electrode to the second negative electrode (step 55). Furthermore, after electrically connecting the first negative electrode to the second negative electrode (i.e. after step 55), the metal-ion battery is ready to be discharged (step 54). Finally, when the voltage of the metal-ion battery is lower than a setting value, the metal-ion battery is ready to be charged (step 51).

According to embodiments of the disclosure, the control element 20 can be a diode. When the potential difference between the first negative electrode and the second negative electrode is greater than the turn-on voltage of the diode, the diode is configured to electrically connect the first negative electrode to the second negative electrode. As a result, the halometallate concentration of the electrolyte can be increased by subjecting the second negative electrode to an electrochemical reaction. In the initial charging and discharging cycles, due to the sufficient halometallate concentration, a large quantity of metal can be formed on the surface of the first negative electrode (such as a nickel electrode), and the diode is not configured to allow the electric current to flow from the first negative electrode to the second negative electrode, since the potential difference between the first negative electrode and the second negative electrode is less than the turn-on voltage of the diode. In the later charging and discharging cycles, due to the insufficient halometallate concentration, a large quantity of metal can be formed on the surface of the first negative electrode (such as a nickel electrode), the amount of metal, which is formed on the surface of the first negative electrode (such as a nickel electrode) via the reduction reaction, is reduced, so that the potential difference between the first negative electrode and the second negative electrode is increased. Thus, the diode is configured to allow the electric current to flow from the first negative electrode to the second negative electrode, since the potential difference between the first negative electrode and the second negative electrode is greater than the turn-on voltage of the diode. Herein, the turn-on voltage of the diode can be from about 0.1V to 1.0V. For example, the potential difference between the first negative electrode and the second negative electrode is about 0.7V, when the first negative electrode is made of nickel, the second negative electrode is made of aluminum, and there is no aluminum formed on the first negative electrode. Therefore, a diode with a turn-on voltage of 0.2V-0.3V can be employed by the metal-ion battery to serve as the control element. When the aluminum (derived from the halometallate) formed on the first negative electrode is gradually consumed so that the potential difference between the first negative electrode and the second negative electrode is greater than the turn-on voltage of the diode, the diode is configured to allow the electric current to flow from the first negative electrode to the second negative electrode.

In addition, according to some embodiments of the disclosure, the control element 20 can be a transistor which determines whether to electrically connect the first negative electrode to the second negative electrode.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

An aluminum foil (with a thickness of 0.025 mm, manufactured by Alfa Aesar) was provided and cut, obtaining an aluminum electrode. Next, a separator (two layers of glass filter paper, with trade No. Whatman 934-AH) was provided. Next, a graphite electrode (including an active layer disposed on a current-collecting substrate, wherein the current-collecting substrate was carbon fiber paper, and the active layer was graphite) was provided. Next, the aluminum electrode, the separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the metal-ion battery (1).

Figure 5:
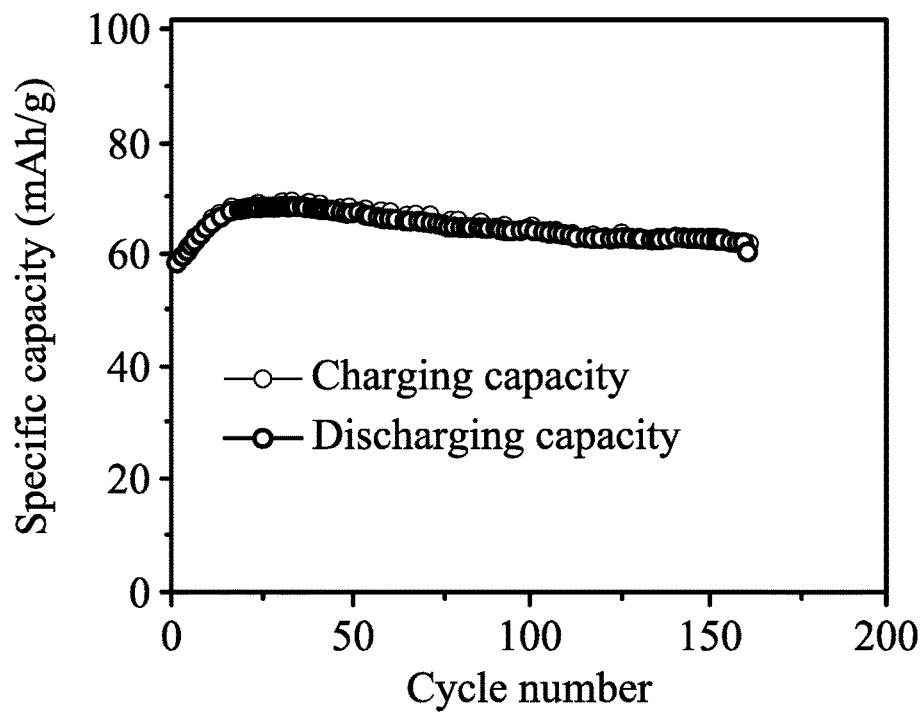
FIGS. 5 and 6 are graphs showing the results of cycling stability tests of the metal-ion batteries according to Comparative Examples of the disclosure.

Next, the metal-ion battery (1) was charged (to about 2.45 V) and discharged (to about 1.5 V) at a current density of about 100 mA/g by a battery analyzer to analyze the performance thereof, and the results are shown in FIG. 5. As shown in FIG. 5, the metal-ion battery (1) was disabled after about 160 charging/discharging cycles.

Comparative Example 2

A foaming nickel sheet (having a thickness of 0.1 mm) was provided and cut, obtaining a nickel electrode. Next, a separator (two layers of glass filter paper, with trade No. Whatman 934-AH) was provided. Next, a graphite electrode (including an active layer disposed on a current-collecting substrate, wherein the current-collecting substrate was carbon fiber paper, and the active layer was graphite) was provided. Next, the nickel electrode, the separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the metal-ion battery (2).

Figure 6:
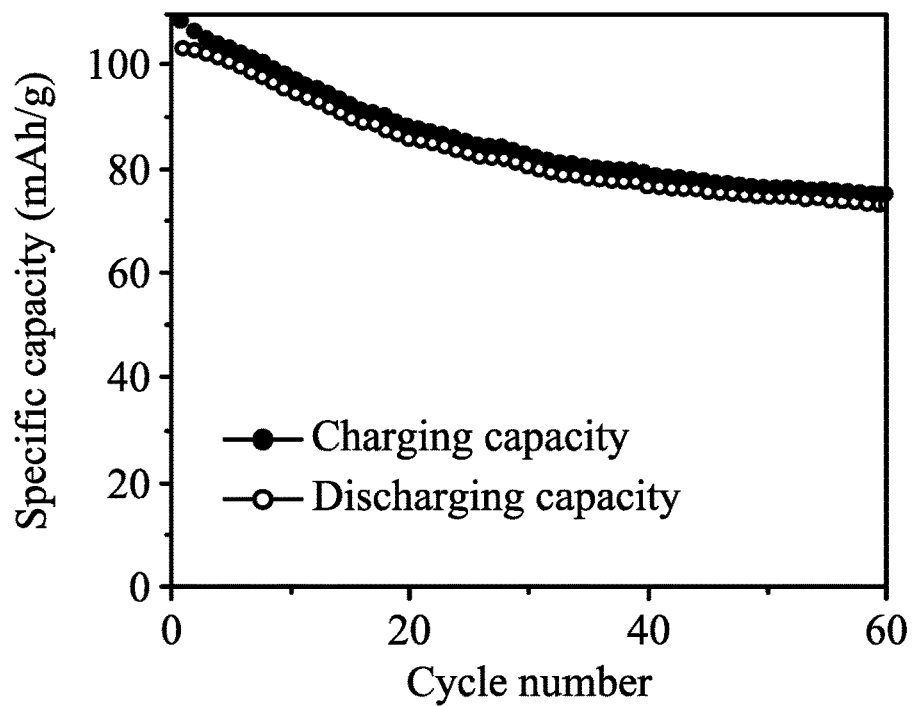
Figure 7:
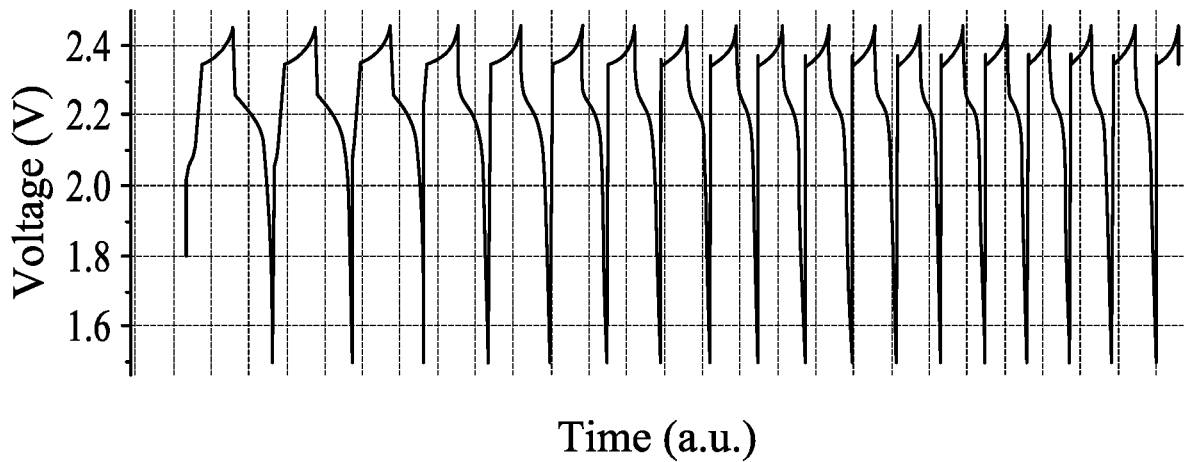
FIG. 7 is a graph plotting voltage against time during charging and discharging of the metal-ion battery according to Comparative Example of the disclosure.

Next, the metal-ion battery (2) was charged (to about 2.45 V) and discharged (to about 1.5 V) at a current density of about 100 mA/g by a battery analyzer to analyze the performance thereof, and the results are shown in FIG. 6. As shown in FIG. 6, the specific capacity of the metal-ion battery (2) was rapidly reduced to less than about 80 mAh/mg after about 50 charging/discharging cycles. FIG. 7 is a graph plotting voltage against time during charging and discharging of the metal-ion battery (2). As shown in FIG. 7, with the increase of the number of charging/discharging cycles, the charging time period and the discharging time period of the metal-ion battery (2) were reduced gradually. This means that the amount of metal ions derived from the metal disposed on the nickel electrode is reduced so that the halometallate concentration of the electrolyte is also reduced. Therefore, the total capacity of the metal-ion battery (2) is inversely proportional to the number of charging/discharging cycles.

Example 1

A foaming nickel sheet (having a thickness of 0.1 mm) was provided and cut, obtaining a nickel electrode. Next, an aluminum foil (with a thickness of 0.025 mm) was provided and cut, obtaining an aluminum electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the aluminum electrode, the separator, the nickel electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (3). In particular, a control element was coupled to the nickel electrode and the aluminum electrode. The control element was used to determine whether to electrically connect the aluminum electrode to the nickel electrode.

Figure 8:
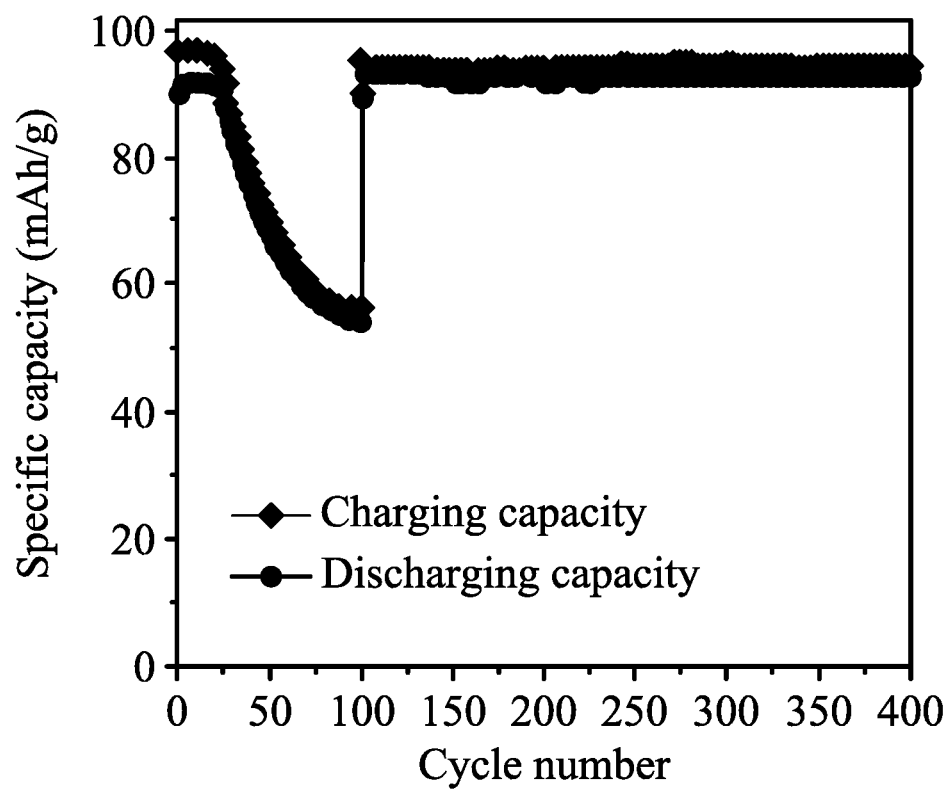
FIG. 8 is a graph showing the result of a cycling stability test of the metal-ion battery according to Example of the disclosure.
Figure 9A:
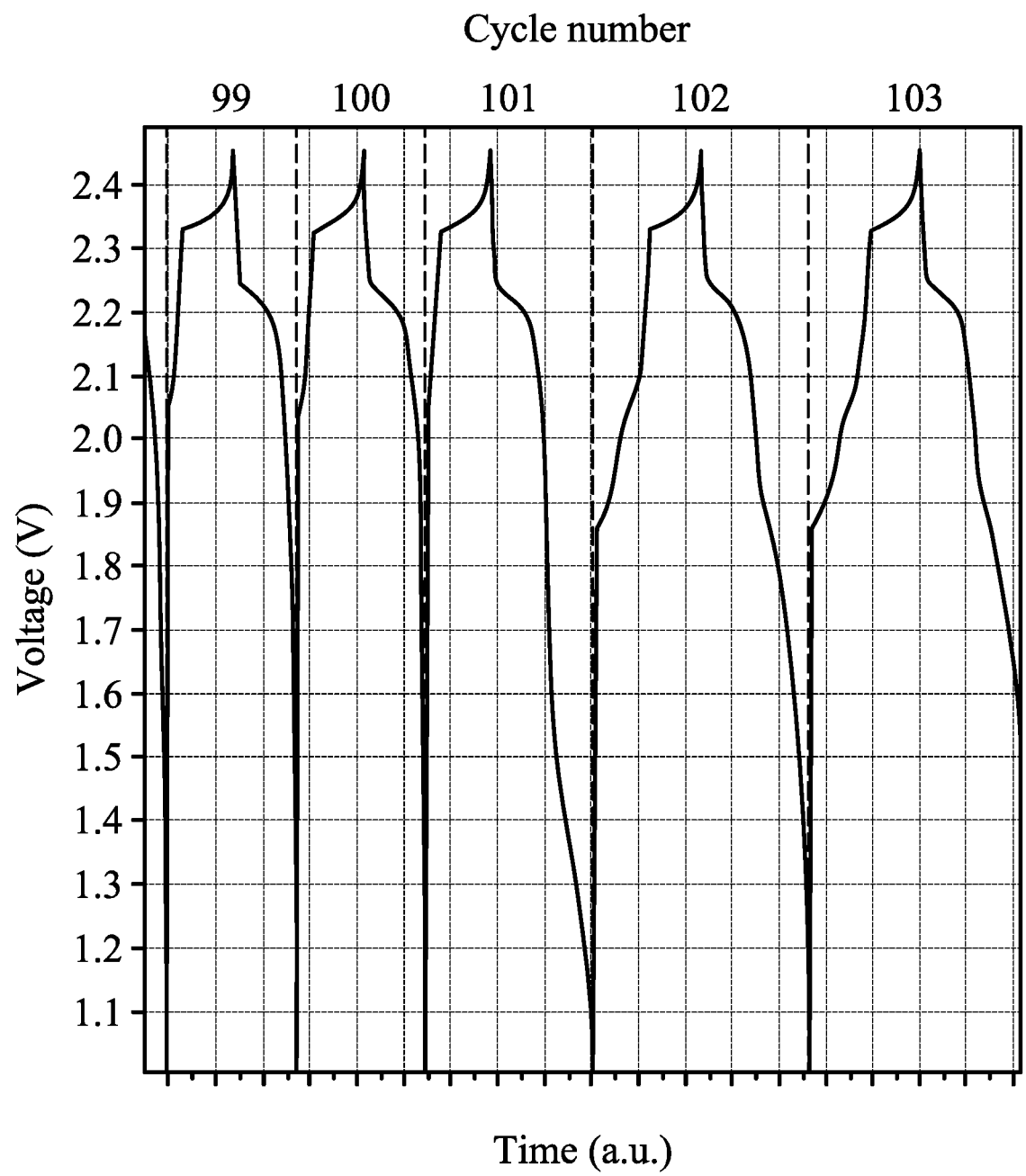
FIGS. 9A and 9B are graphs plotting voltage against time during charging and discharging of the metal-ion batteries according to Examples of the disclosure.
Figure 9B:
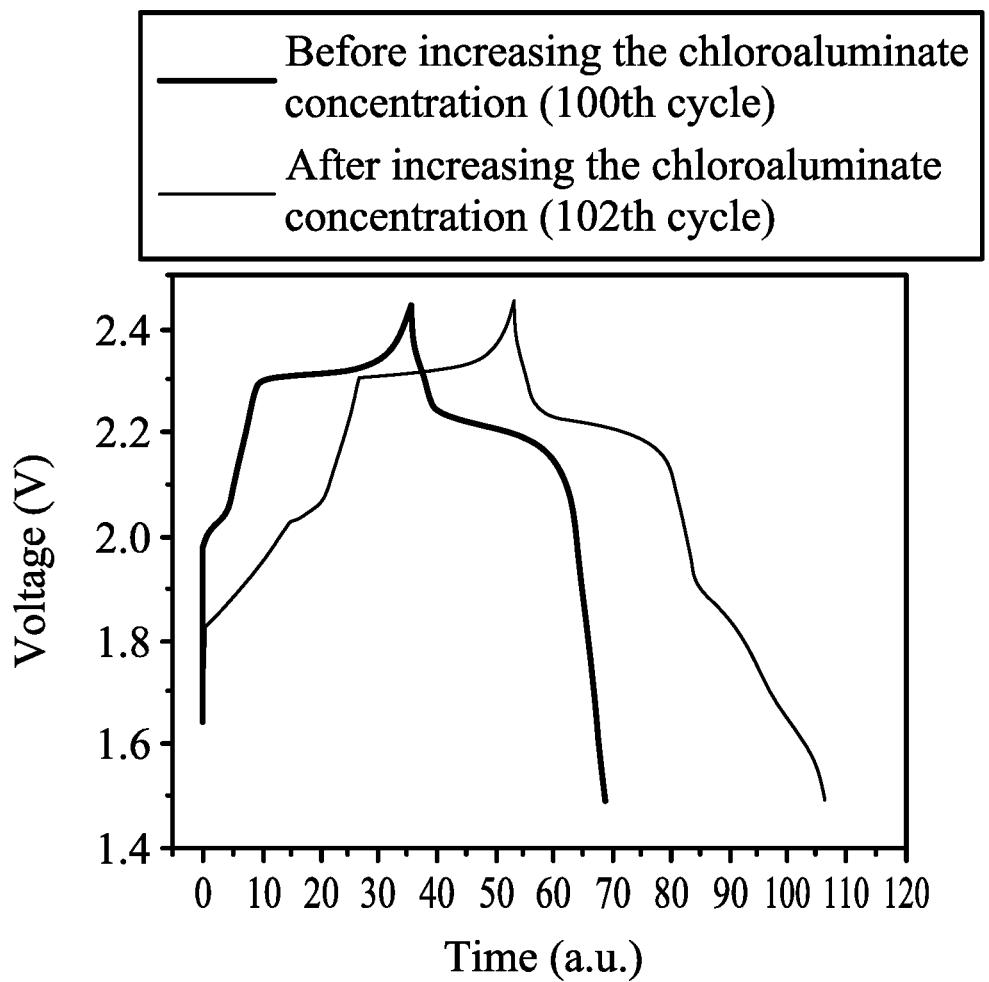

Next, the metal-ion battery (3) was charged (to about 2.45 V) and discharged (to about 1.0 V) at a current density of about 100 mA/g by a battery analyzer to analyze the performance thereof, and the results are shown in FIG. 8. As shown in FIG. 8, the specific capacity of the metal-ion battery (3) (the nickel electrode did not electrically connect to the aluminum electrode herein) was rapidly reduced to less than about 60 mAh/mg after 100 charging/discharging cycles. On the 101st charging/discharging cycle, the control element was configured to electrically connect the nickel electrode to the aluminum electrode after charging of the metal-ion battery (3) was completed, and then the metal-ion battery (3) was discharged in order to increase the chloroaluminate concentration of the electrolyte. Herein, the specific capacity of the metal-ion battery (3) was rapidly increased, as shown in FIG. 8. FIG. 9A is a graph plotting voltage of the metal-ion battery (3) against time before and after electrically connecting the nickel electrode to the aluminum electrode. FIG. 9B is a graph plotting voltage of the metal-ion battery (3) against time before and after increasing the chloroaluminate concentration of the electrolyte. As shown in FIGS. 9A and 9B, after electrically connecting the nickel electrode to the aluminum electrode in order to increase the chloroaluminate concentration of the electrolyte, the charging time period and the discharging time period of the metal-ion battery (3) were obviously lengthened. This means that the total capacity of the metal-ion battery (3) is increased.

Example 2

A carbon paper (available from CeTech Co., Ltd.) was provided and cut, obtaining a carbon paper electrode. Next, an aluminum foil (with a thickness of 0.025 mm) was provided and cut, obtaining an aluminum electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the aluminum electrode, the separator, the carbon paper electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (4). In particular, a control element was coupled to the carbon paper electrode and the aluminum electrode. The control element was used to determine whether to electrically connect the aluminum electrode to the carbon paper electrode.

Figure 10:
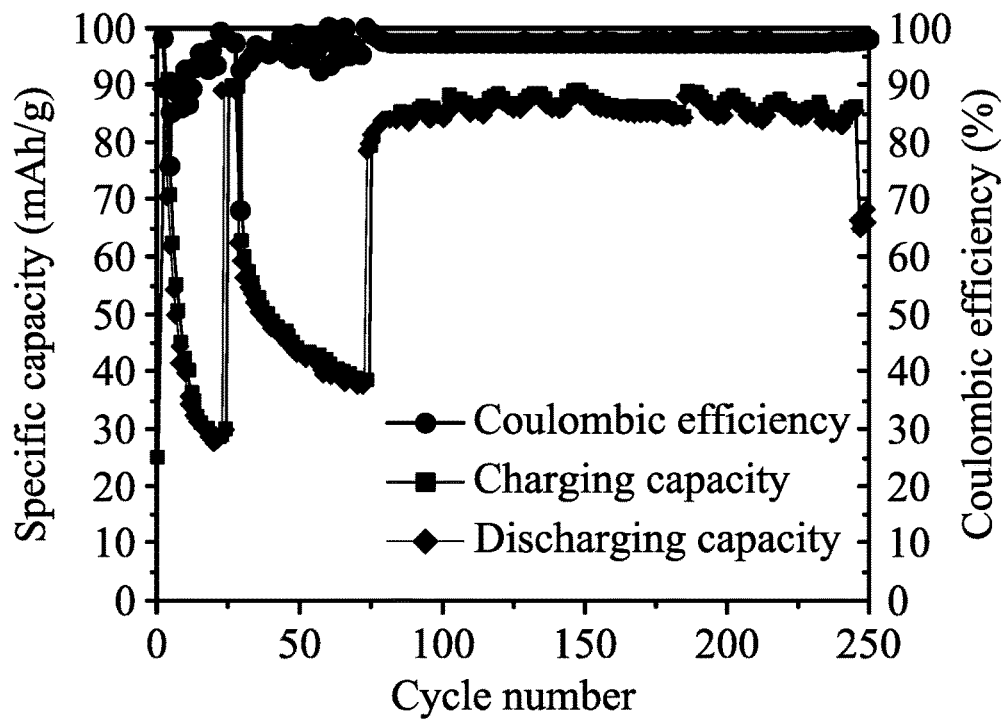
FIGS. 10-14 are graphs showing the result of cycling stability tests of the metal-ion batteries according to Examples of the disclosure.

Next, the metal-ion battery (4) was charged (to about 2.45 V) and discharged (to about 1.5 V) at a current density of about 100 mA/g by a battery analyzer to analyze the performance thereof, and the results are shown in FIG. 10. As shown in FIG. 10, the specific capacity of the metal-ion battery (4) (the carbon paper electrode did not electrically connect to the aluminum electrode herein) was rapidly reduced to less than about 25 mAh/mg after 25 charging/discharging cycles. On the 26th charging/discharging cycle, the control element was configured to electrically connect the carbon paper electrode to the aluminum electrode after charging of the metal-ion battery (4) was completed, and then the metal-ion battery (4) was discharged in order to increase the chloroaluminate concentration of the electrolyte. Herein, the specific capacity of the metal-ion battery (4) was rapidly increased, as shown in FIG. 10. Next, after 26th discharging, the control element was configured to electrically disconnect the carbon paper electrode from the aluminum electrode, and then the charging/discharging cycles were conducted. The specific capacity of the metal-ion battery (4) was rapidly reduced to less than about 40 mAh/mg after 75 charging/discharging cycles. On the 76th charging/discharging cycle, the control element was configured to electrically connect the carbon paper electrode to the aluminum electrode after charging of the metal-ion battery (4) was completed, and then the metal-ion battery (4) was discharged in order to increase the chloroaluminate concentration of the electrolyte. Herein, the specific capacity of the metal-ion battery (4) was rapidly increased, as shown in FIG. 10.

Example 3

A foaming nickel sheet (having a thickness of 0.1 mm) was provided and cut, obtaining a nickel electrode. Next, a zinc foil (with a thickness of 0.03 mm) was provided and cut, obtaining a zinc electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the zinc electrode, the separator, the nickel electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (5). In particular, a control element was coupled to the nickel electrode and the zinc electrode. The control element was used to determine whether to electrically connect the zinc electrode to the nickel electrode.

Figure 11:
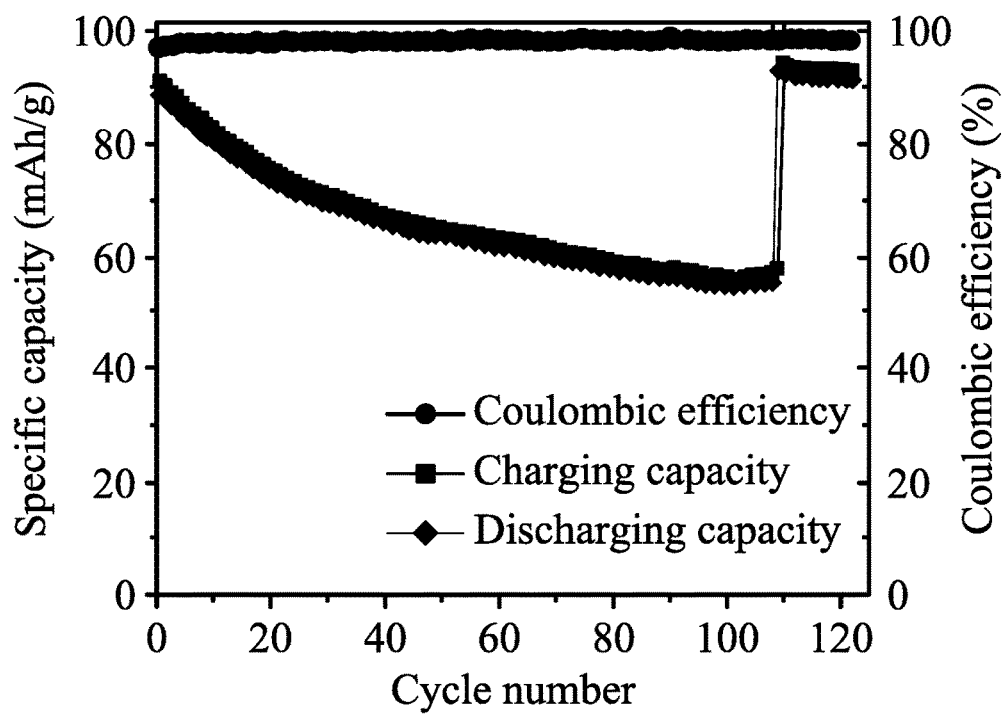

Next, the metal-ion battery (5) was charged (to about 2.45 V) and discharged (to about 1.0 V) at a current density of about 100 mA/g by a battery analyzer to analyze the performance thereof, and the results are shown in FIG. 11. As shown in FIG. 11, the specific capacity of the metal-ion battery (5) (the nickel electrode did not electrically connect to the zinc electrode herein) was reduced to less than about 60 mAh/mg after 110 charging/discharging cycles. On the 111th charging/discharging cycle, the control element was configured to electrically connect the nickel electrode to the zinc electrode after charging of the metal-ion battery (5) was completed, and then the metal-ion battery (5) was discharged in order to increase the chlorozincate concentration of the electrolyte. Herein, the specific capacity of the metal-ion battery (5) was rapidly increased, as shown in FIG. 11.

Example 4

A foaming nickel sheet (having a thickness of 0.1 mm) was provided and cut, obtaining a nickel electrode. Next, a copper foil (with a thickness of 0.03 mm) was provided and cut, obtaining a copper electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the copper electrode, the separator, the nickel electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (6). In particular, a control element was coupled to the nickel electrode and the copper electrode. The control element was used to determine whether to electrically connect the copper electrode to the nickel electrode.

Figure 12:
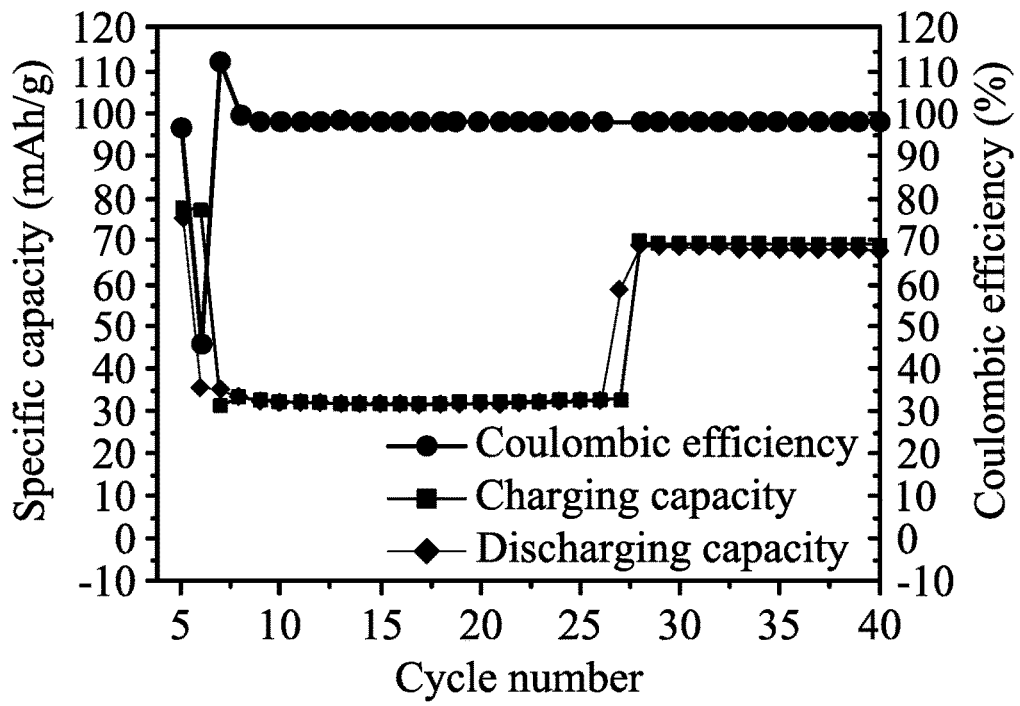

Next, the metal-ion battery (6) was charged (to about 2.45 V) and discharged (to about 1.5 V) at a current density of about 100 mA/g by a battery analyzer to analyze the performance thereof, and the results are shown in FIG. 12. As shown in FIG. 12, the specific capacity of the metal-ion battery (6) (the nickel electrode did not electrically connect to the copper electrode herein) was reduced to less than about 60 mAh/mg after 7 charging/discharging cycles. On the 8th charging/discharging cycle, the control element was configured to electrically connect the nickel electrode to the copper electrode after charging of the metal-ion battery (6) was completed, and then the metal-ion battery (6) was discharged in order to increase the chlorocopper complex concentration of the electrolyte. Herein, the specific capacity of the metal-ion battery (6) was rapidly increased, as shown in FIG. 12.

Example 5

A foaming nickel sheet (having a thickness of 0.1 mm) was provided and cut, obtaining a nickel electrode. Next, a stainless steel foil (with a thickness of 0.03 mm, available from Alfa Aesar) was provided and cut, obtaining a stainless steel electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the stainless steel electrode, the separator, the nickel electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (7). In particular, a control element was coupled to the nickel electrode and the stainless steel electrode. The control element was used to determine whether to electrically connect the stainless steel electrode to the nickel electrode.

Figure 13:
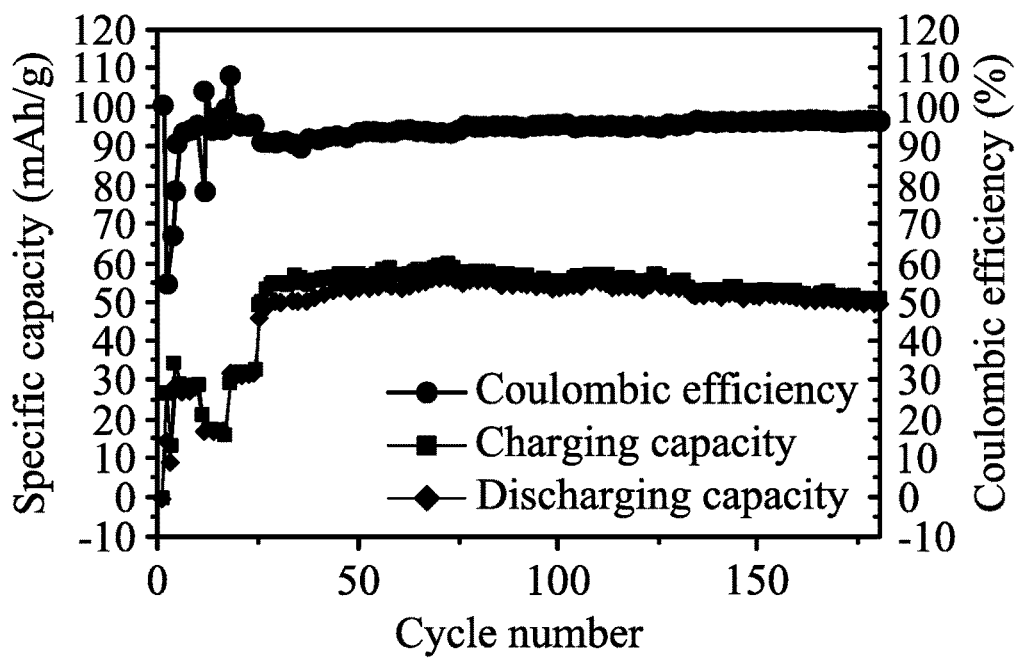

Next, the metal-ion battery (7) was charged (to about 2.45 V) and discharged (to about 1.5 V) at a current density of about 100 mA/g by a battery analyzer to analyze the performance thereof, and the results are shown in FIG. 13. As shown in FIG. 13, at third, 20th, and 25th charging/discharging cycles, the control element was configured to electrically connect the nickel electrode to the stainless steel electrode after charging of the metal-ion battery (7) was completed, and then the metal-ion battery (7) was discharged in order to increase the chloroferrate concentration of the electrolyte. Herein, the specific capacity of the metal-ion battery (7) was rapidly increased, as shown in FIG. 13.

Example 6

A foaming nickel sheet (having a thickness of 0.1 mm) was provided and cut, obtaining a nickel electrode. Next, an aluminum foil (with a thickness of 0.025 mm) was provided and cut, obtaining an aluminum electrode. Next, separators (two layers of glass filter paper, with trade No. Whatman 934-AH) were provided. Next, a graphite electrode (including an active layer disposed on a current-collecting substrate, wherein the current-collecting substrate was carbon fiber paper, and the active layer was graphite) was provided. Next, the aluminum electrode, the separator, the nickel electrode, another separator, and the graphite electrode were placed in sequence and sealed within an aluminum plastic pouch. Next, an electrolyte (including aluminum chloride ($AlCl_3$) and 1-ethyl-3-methylimidazolium chloride ([EMIm]Cl, wherein the molar ratio between $AlCl_3$ and [EMIm]Cl was about 1.3:1) was injected into the aluminum plastic pouch, obtaining the aluminum-ion battery (8). In particular, a diode (with a turn-on voltage of 0.2 V) was coupled to the nickel electrode and the aluminum electrode.

Figure 14:
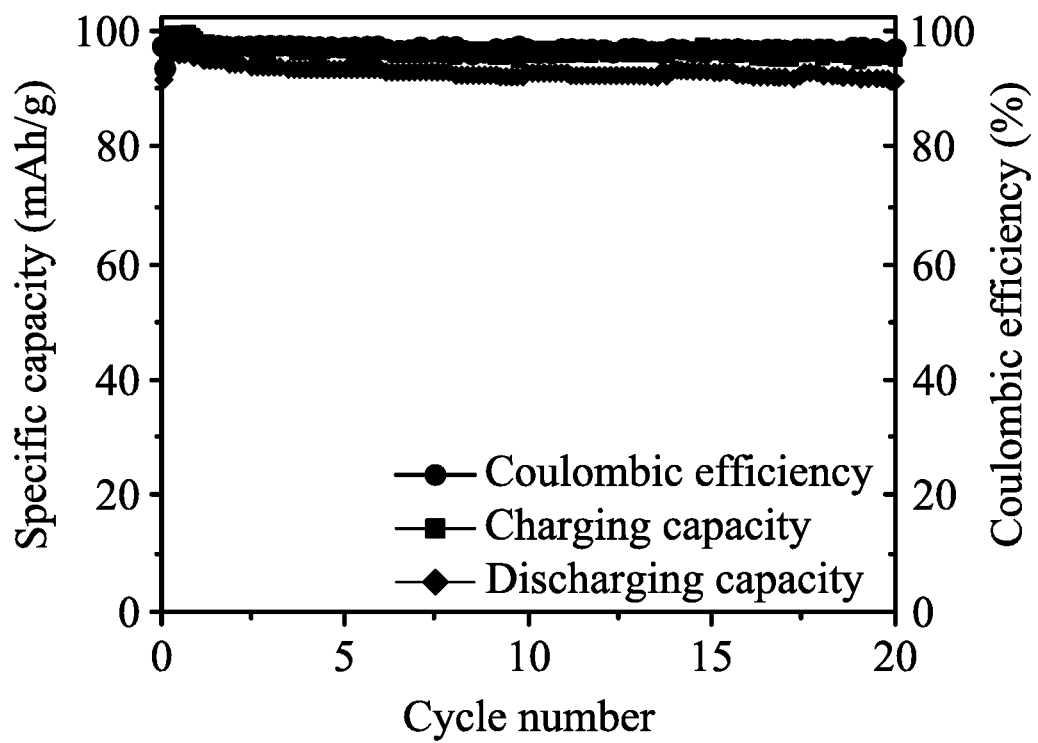

Next, the metal-ion battery (8) was charged (to about 2.45 V) and discharged (to about 1.0 V) at a current density of about 100 mA/g by a battery analyzer to analyze the performance thereof, and the results are shown in FIG. 14. As shown in FIG. 14, the diode was configured to allow the electric current flows from the nickel electrode to the aluminum electrode when the potential difference between the nickel electrode and the aluminum electrode was greater than 0.2V in order to increase the chloroaluminate concentration of the electrolyte. After, the diode was configured to electrically disconnect the nickel electrode from the aluminum electrode. Therefore, the total capacity of the metal-ion battery (8) has maintained above 90 mAh/mg.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A metal-ion battery, comprising:
   a positive electrode;
   a first negative electrode, wherein the first negative electrode is a first metal;
   a first separator disposed between the positive electrode and the first negative electrode;
   a second negative electrode, wherein the second negative electrode is a second metal;
   a second separator disposed between the first negative electrode and the second negative electrode; and
   a control element coupled to the first negative electrode and the second negative electrode, wherein the control element determines whether to electrically connect the first negative electrode to the second negative electrode, and wherein one of the first metal and the second metal is an inactive metal, and the other is a metal which has a reduction potential smaller than the reduction potential of the inactive metal.

2. The metal-ion battery as claimed in claim 1, wherein the positive electrode consists of a current-collecting layer and an active material.

3. The metal-ion battery as claimed in claim 2, wherein the current-collecting layer is a conductive carbon substrate.

4. The metal-ion battery as claimed in claim 3, wherein the conductive carbon substrate comprises a carbon cloth, carbon felt, or carbon paper.

5. The metal-ion battery as claimed in claim 2, wherein the active material comprises a layered active layer.

6. The metal-ion battery as claimed in claim 2, wherein the active material comprises graphite, carbon nanotube, graphene, or a combination thereof.

7. The metal-ion battery as claimed in claim 6, wherein the graphite comprises nature graphite, artificial graphite, mesophase carbon microbeads, pyrolytic graphite, foamed graphite, flake graphite, expanded graphite, or a combination thereof.

8. The metal-ion battery as claimed in claim 1, wherein the first negative electrode is disposed between the first separator and the second separator.

9. The metal-ion battery as claimed in claim 1, wherein the first metal is an inactive metal.

10. The metal-ion battery as claimed in claim 1, wherein the first negative electrode comprises a current-collecting layer.

11. The metal-ion battery as claimed in claim 9, wherein the first metal is nickel, tungsten, tantalum, molybdenum, gold, lead, platinum, or silver, and the second metal is aluminum, copper, zinc, tin, or iron.

12. The metal-ion battery as claimed in claim 1, wherein the second metal is an inactive metal.

13. The metal-ion battery as claimed in claim 12, wherein the second metal is nickel, tungsten, tantalum, molybdenum, gold, lead, platinum, or silver, and the first metal is aluminum, copper, zinc, tin, or iron.

14. The metal-ion battery as claimed in claim 1, wherein the control element comprises a diode or transistor.

15. The metal-ion battery as claimed in claim 14, wherein when the potential difference between the first negative electrode and the second negative electrode is greater than the turn-on voltage of the diode, the diode is configured to electrically connect the first negative electrode to the second negative electrode.

16. The metal-ion battery as claimed in claim 15, wherein the potential difference is from 0.1V to 2.0V.

17. The metal-ion battery as claimed in claim 1, wherein the control element is comparison circuitry.

18. The metal-ion battery as claimed in claim 17, wherein when the time period, which the metal-ion battery achieves to a predetermined charging voltage, is shorter than a predetermined time period, the first negative electrode connects with the second negative electrode via the comparison circuitry.

19. The metal-ion battery as claimed in claim 18, wherein the predetermined time period is the time period required for charging the metal-ion battery to a predetermined specific capacity.

20. The metal-ion battery as claimed in claim 19, wherein the predetermined specific capacity is from 60 mAh/g to 90 mAh/g.

* * * * *